July 12, 1960   K. G. MACLEISH ET AL   2,944,783
OPTICAL MOUNTING DEVICE
Filed Jan. 13, 1958   2 Sheets-Sheet 1
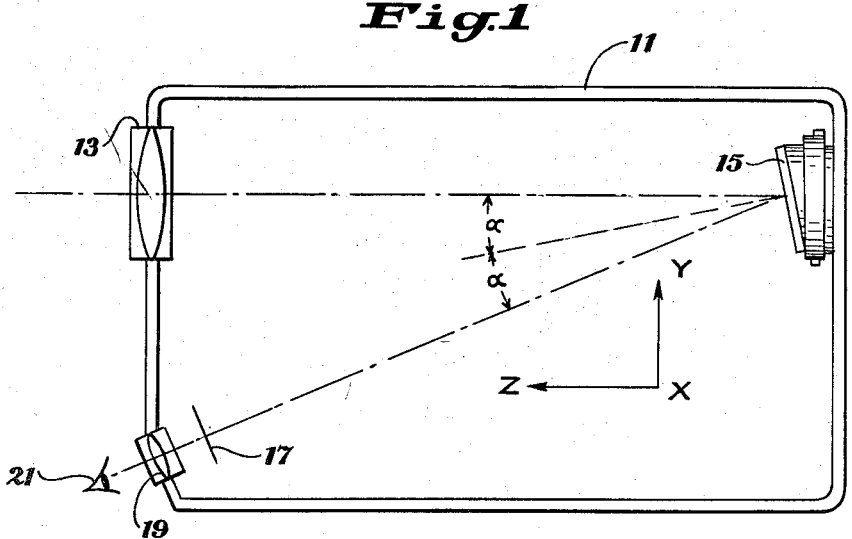
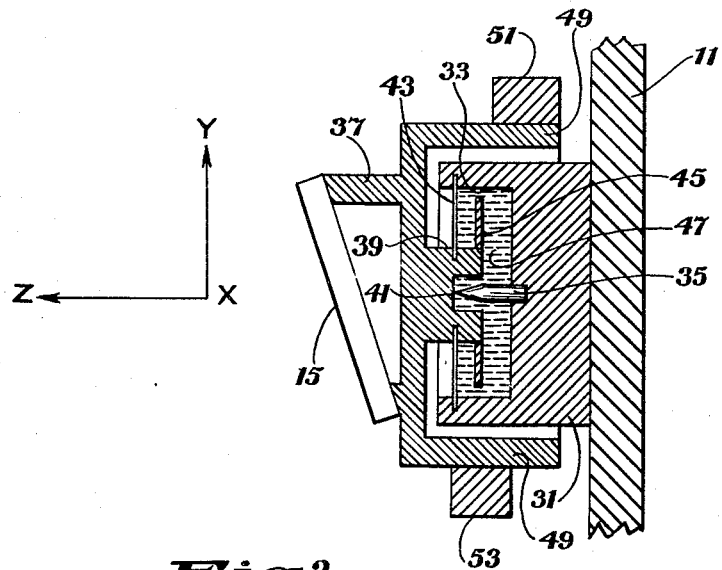
Kenneth G. Macleish
Robert E. Kesel
INVENTORS July 12, 1960

K. G. MACLEISH ET AL 2,944,783

OPTICAL MOUNTING DEVICE

Filed Jan. 13, 1958

Kenneth G. Macleish
Robert E. Kesel
INVENTORS

BY
ATTORNEYS

United States Patent Office 2,944,783
Patented July 12, 1960

2,944,783
OPTICAL MOUNTING DEVICE

Kenneth G. Macleish and Robert E. Kesel, Rochester, N.Y., assignors, by mesne assignments, to the United States of America as represented by the Secretary of the Navy Filed Jan. 13, 1958, Ser. No. 708,735

2 Claims. (Cl. 248—358)

This invention relates to a mounting device and more particularly to a device for mounting an element of an optical system by which the effects of vibrations upon the element can be substantially reduced or eliminated.

In prior known optical systems utilized for visual sighting or infrared detecting of various targets, vibrations which are imparted to the optical instrument create an undesirable blurring of the target image and/or result in the generation of spurious electrical signals which may interfere with the proper operation of the sighting or detecting system. The present invention was devised in order to overcome this fault and utilizes broadly a device for mounting a mirror or other element of the optical system in which certain vibrations imparted to the case enclosing the optical system, are absorbed and are not transmitted to the optical element. The mounting device of the present invention comprises a base having a cavity filled with a viscous damping fluid, a support member extending into the cavity into engagement with a positioning means provided therein and a flexible annulus for resiliently mounting the support in the cavity and for preventing escape of the fluid from the cavity whereby an optical element carried by the support is substantially unaffected by certain vibrations which are imparted to the base and absorbed by the flexible annulus and the damping fluid.

The primary object of the present invention is, therefore, to provide a mounting device for an element of an optical system in which the effects of certain vibrations on the optical element are substantially reduced or eliminated.

Another object of the present invention is to provide a mounting device for an element of an optical system in which a vibration damping means is utilized for substantially reducing or eliminating the effects of certain vibrations on the element which vibrations are imparted to the case in which the optical system is mounted.

Still other objects and advantages of the present invention will become readily apparent to those skilled in the art from the following description with reference to the drawings in which like characters denote like parts and wherein:

Fig. 1 is an elevation view illustrating the general arrangement of the elements of an optical system and including a mirror mounted in accordance with the present invention;

Fig. 2 is an enlarged cross-sectional view of the mounting device shown in Fig. 1;

Figure 3:
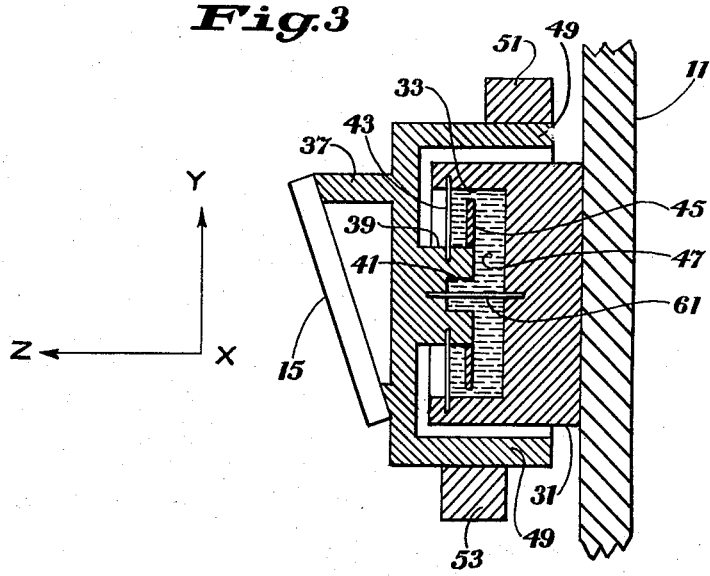
Fig. 3 is an enlarged cross-sectional view of a mounting device made in accordance with the present invention and representing a modification of the embodiment shown in Fig. 2.
Figure 4:
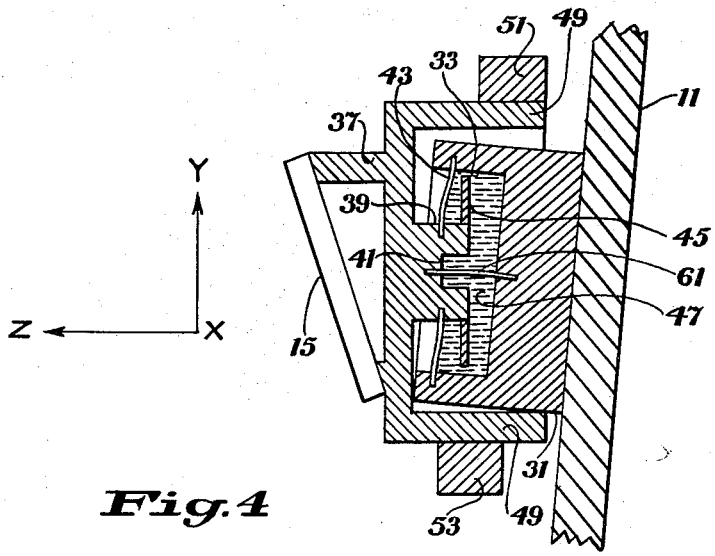
Fig. 4 is a cross-sectional view of the mounting device shown in Fig. 3 and illustrating an extreme position taken by the parts in response to vibrations imparted to the supporting base of the optical system.

An optical system incorporating the mounting device of the preesnt invention is illustrated in Fig. 1. In order to facilitate the description of the invention, directions will be referenced to the arbitrarily taken coordinate axes X, Y and Z illustrated in Fig. 1. The position of the parts of the optical system relative to the axes X, Y and Z has been maintained in all other figures of the drawings. In Fig. 1 the optical system is shown mounted in a case 11 and comprising an objective 13, a mirror 15, a reticle 17 and an eye lens 19 through which the image of the field focused by objective 13 onto reticle 17, is viewed by an operator as indicated by the eye 21. In the known prior art optical systems, angular vibrations about the X or Y axis imparted to the case 11, would make the distant object under observation appear to vibrate with respect to reticle 17. Of course, this effect is generally undesirable since it may result in blurring of the image rendering the object difficult to see and hindering the determination of its exact position on the reticle.

These effects of angular vibrations about the X or Y axis are substantially reduced or eliminated by the mounting device of the present invention illustrated in Fig. 2. The mounting device comprises a base 31 rigidly attached to the case 11 and having a longitudinal bore 33. Positioning means in the form of a pivot pin 35 is located in the bottom of the bore 33 and is mounted along the longitudinal axis of bore 33. Mirror 15 is carried on a suitable support 37 having an extension 39 of reduced diameter. Extension 39 is formed with a recess 41 on the end thereof for engagement with the pivot pin 35. A thin circular metal annulus or diaphragm 43 is mounted with the outer peripheral edge thereof fixed to the base 31 within bore 33 and with the inner peripheral edge thereof fixed to the outer periphery of extension 39. Diaphragm 43 not only provides a flexible support for extension 39 in bore 33 resiliently holding extension 39 in engagement with pin 35 but also forms a closure and fluid seal between bore 33 and the support 37. A circular baffle plate 45 is fixed to the end of extension 39 and has an outer diameter which is slightly less than that of the diameter of bore 33. A relatively viscous damping fluid 47 is provided in bore 33 substantially filling the same. A circular side extension or skirt 49 on support 37 carries suitable weights 51 and 53 positioned to make the center of mass of the mirror 15 and support 37 coincide with the point of engagement between the pin 35 and extension 39 which also coincides with the plane of the diaphragm 43. The weights 51 and 53 are offset with respect to each other in the Z direction in order to provide dynamic balance for the mirror 15 and support 37 about the Z axis.

The operation of the mounting device made in accordance with the preesnt invention is as follows:

For translational movements or vibrations of the case 11 along the X, Y or Z axis, mirror 15 moves as if rigidly attached to the case 11. For angular movements or vibrations of the case 11 about the Z axis, mirror 15 rotates as if rigidly attached to the case 11. For angular movements or vibrations about the X or Y axis, the mirror 15 remains substantially stationary, such movements being absorbed by the damping fluid 47 and diaphragm 43 of the mounting device. For example, let us assume that a rotational vibration about the X axis is imparted to case 11. Since base 31 is rigidly fixed to case 11 it moves simultaneously with case 11, as does the outer periphery of circular diaphragm 43 which is fixed to base 31. However, because of the inertia of support 37 and as a result of the dynamic balance thereof, the extension 39 and the inner periphery of diaphragm 43 tends to remain stationary with the result that diaphragm 43 flexes and base 31 pivots with respect to support 37 about pin 35. The damping fluid 47 is thus forced across baffle plate 45 tending to absorb vibrational movement and preventing any subsequent oscillations of the support 37. The flexural stiffness of diaphragm 43 together with the moment of inertia of mirror 15 on support 37 determines the resonant frequency about the X and Y axes. Therefore, angular vibrations of the case 11 having a frequency of at least several times the resonant frequency will not be transmitted to the mirror 15 or transmitted in a minor degree only, and hence for these motions, the mirror 15 remains substantially stationary in space. Obviously for angular vibrations about the X and Y axes having a frequency considerably below the resonant frequency, mirror 15 behaves substantially as if it were mounted directly on case 11. Therefore, the optical system responds faithfully to relatively slow rotational movement of the case 11 as is required in following slowly moving targets in the field of view.

The modification of the mounting device illustrated in Fig. 3 is identical to that illustrated in Fig. 2 except that the positioning means is a resilient wire 61 instead of a pin 35. Wire 61 is rigidly mounted on one end in the base 31 along the longitudinal axis of bore 33 and is rigidly mounted on the other end thereof in the recess 41. Again it should be noted that the point on the surface of recess 41 at which wire 61 is mounted corresponds to the center of mass of the support 37 and lies in the plane of diaphragm 43. In this embodiment the rotational vibrations around the X and Y axes are opposed only by the relatively small combined flexural stiffness of wire 61 and diaphragm 43 while the motion of support 37 in the Z direction is rigidly opposed by the relatively high longitudinal stiffness of wire 61. Thus it will be appreciated that wire 61 is equivalent to pivot 35 in operation and in effect, but possesses the advantages of improved simplicity and ruggedness.

In utilizing the mounting device of the present invention in the optical system illustrated in Fig. 1 it was found that the optical distance between the objective 13 and the mirror 15 should be approximately equal to the optical distance between the mirror 15 and the reticle 17. When those distances were exactly equal, the optical system was corrected for high frequency vibrations around the X axis, but was slightly undercorrected for vibrations occurring around the Y axis unless the angle $\alpha$ was equal to zero. When the ratio of the distances between the objective 13 and mirror 15, and the mirror 15 and reticle 17, is equal to the factor $\cos^2 \alpha$, the system was fully corrected for angular vibrations occurring around the Y axis but was slightly overcorrected for vibrations occurring around the X axis. Since $\alpha$ was about 11.5 degrees, the factor $\cos^2 \alpha$ was very nearly equal to unity and a good compromise was obtained by making the ratio of distances between the object and mirror, and the mirror and reticle equal to about half way between the factor $\cos^2 \alpha$ and unity.

It will now be apparent that we have disclosed a mounting device for an element of an optical system in which the effects of certain vibrations on the optical element are substantially reduced or eliminated.

While only two embodiments of the present invention have been specifically illustrated and described it is realized that many modifications and variations are possible and will become readily apparent to those skilled in the art from the foregoing description which is intended, therefore, to be illustrative only and the scope of the invention is defined in the appended claims.

Having now particularly described our invention, what we desire to secure by Letters Patent of the United States and what we claim is:

1. In a mounting device for an optical element having a viscous damping fluid for stabilizing said optical element, a support member for rigidly carrying said element, an extension formed on said support member opposite said element, a depending skirt portion formed on said support member concentric to said extension and spaced radially outwardly therefrom, a base member having formed in one end thereof a cavity for receiving said viscous fluid, said cavity being substantially larger than said extension whereby said extension is positionable in said cavity, positioning means fixed on the inner end of said cavity along the longitudinal axis thereof for engaging the end of said extension and longitudinally positioning said extension in said cavity, baffle means fixed on said extension and positioned within said cavity, said viscous fluid substantially filling said cavity and surrounding said extension and said baffle means, a diaphragm mounted between said base member and said extension, said diaphragm being flexible to resiliently support said extension in alignment with said positioning means and being imperforate to close said cavity for preventing the escape of said fluid therefrom, and weight means mounted on said depending skirt portion positioned without said cavity to provide dynamic balance for said support member and said element about the point of engagement of said positioning means and said extension whereby said element remains substantially unaffected by certain vibrations which are imparted to said base member and are absorbed by the flexing of said diaphragm and by said fluid.

2. In a mounting device for an optical element having a viscous damping fluid for stabilizing said optical element, a support member for rigidly carrying said element, an extension formed on said support member opposite said element, a depending skirt portion formed on said support member concentric to said extension and spaced radially outwardly therefrom, a base member having a longitudinal bore extending into one end thereof for receiving a viscous fluid, said bore being substantially larger than said extension whereby said extension is positionable in said bore, a resilient element fixed in the inner end of said bore along the longitudinal axis thereof and in the end of said extension for longitudinally positioning said extension in said bore, baffle means fixed on said extension within said bore, said viscous fluid substantially filling said bore and surrounding said extension and baffle means, an annular diaphragm for preventing the escape of said fluid from said bore, the outer periphery of said diaphragm being mounted in fluid tight contact with the peripheral wall of said bore and the inner periphery of said diaphragm being fixed in fluid tight engagement with said extension, said diaphragm being flexible to resiliently support said extension in alignment with said element and being positioned on said extension in a plane which includes the point at which said element is fixed in said extension, and weight means mounted on said depending skirt portion without said bore to provide dynamic balance for said support member and said element about said point, whereby said element remains substantially unaffected by certain vibrations which are imparted to said base member and are absorbed by the flexing of said diaphragm and by said fluid.

References Cited in the file of this patent

UNITED STATES PATENTS

| 1,082,014 | Digby | Dec. 23, 1913 |
| 1,885,098 | Hill | Oct. 25, 1932 |
| 2,146,859 | Seklehner | Feb. 14, 1939 |

FOREIGN PATENTS

| 493,216 | Canada | May 26, 1953 |